Apr. 3, 1923.
S. V. V. PRINCE.
MOTOR PLOW.
ORIGINAL FILED JAN. 8, 1919.
1,450,385.
2 SHEETS—SHEET 1.
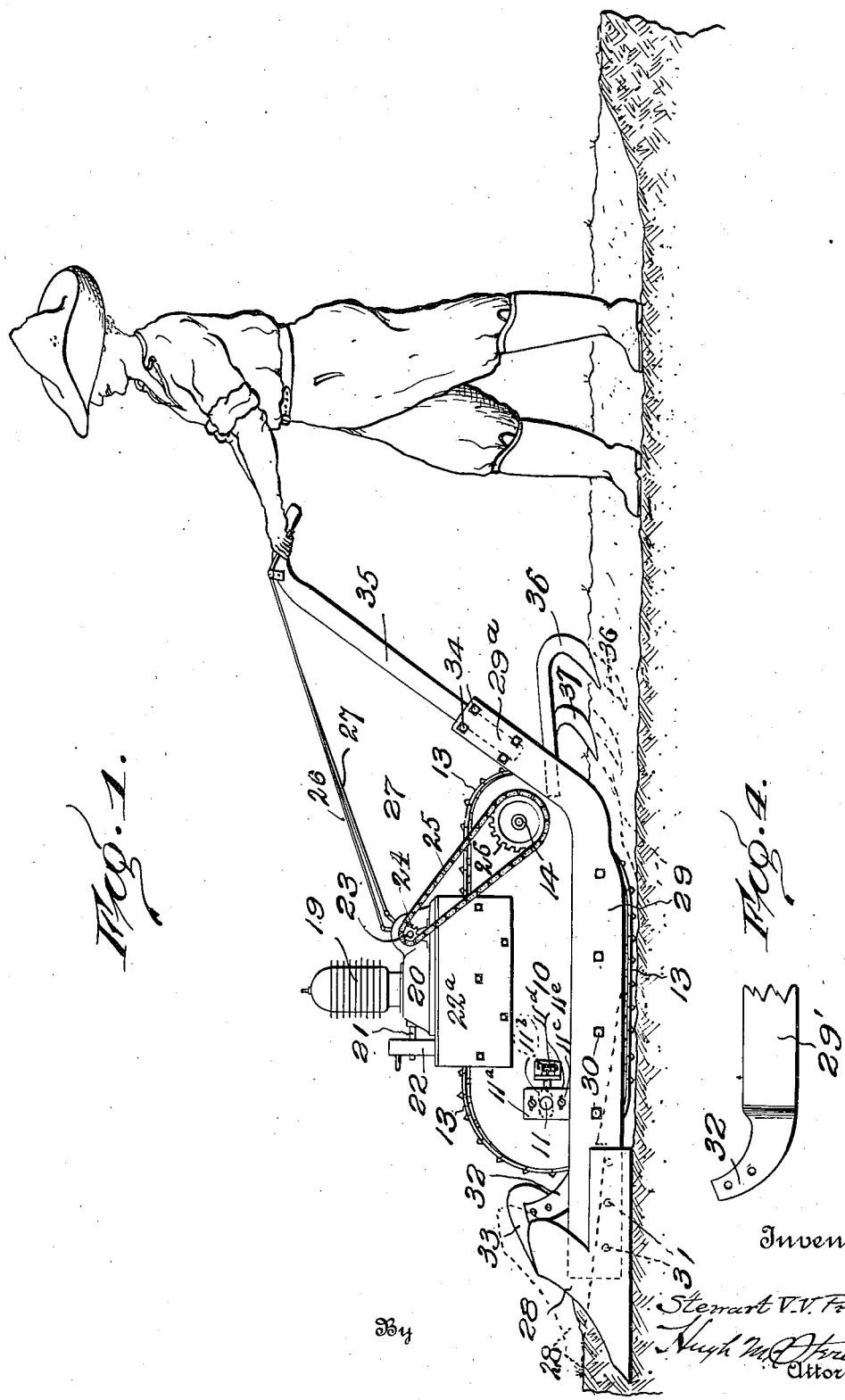
Inventor
Stewart V. V. Prince
By Hugh M. O'Kreaig
Attorney

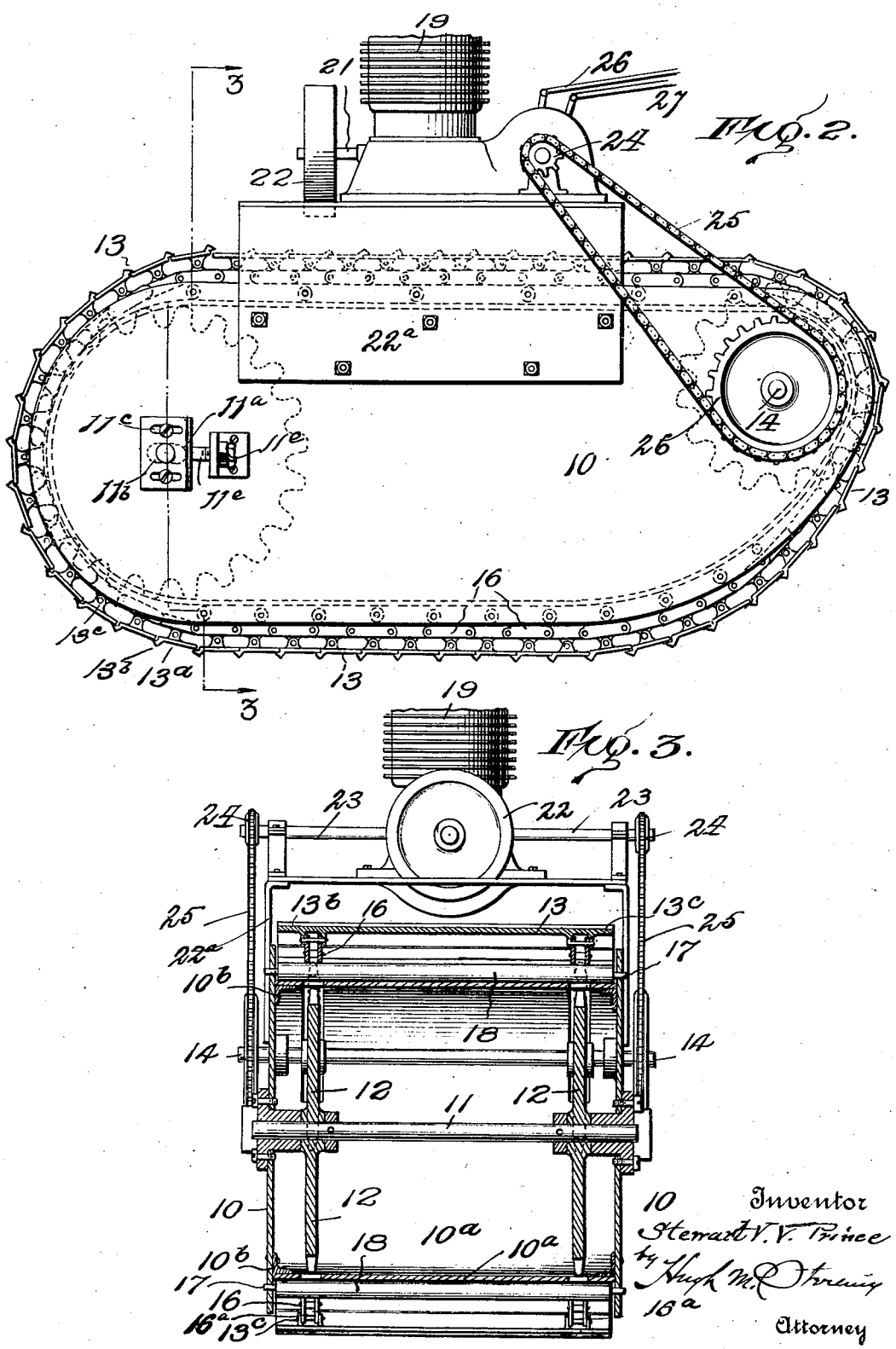

Patented Apr. 3, 1923.

1,450,385

UNITED STATES PATENT OFFICE.

STEWART V. V. PRINCE, OF WASHINGTON, DISTRICT OF COLUMBIA.

MOTOR PLOW.

Application filed January 8, 1919, Serial No. 270,163. Renewed April 13, 1922. Serial No. 552,136.

*To all whom it may concern:*

Be it known that I, STEWART V. V. PRINCE, a citizen of the United States of America, residing at Washington, in the District of Columbia, have invented certain new and useful Improvements in Motor Plows, of which the following is a specification.

This invention relates to motor operated implements for use mainly in tilling the soil, preparing it for plowing and cultivating the growing crops, and the object of the invention is to provide a motor operated implement of this character, especially for plowing, that can be manipulated by an attendant by means of handles and bodily controlled after the manner of a horse-drawn plow in order to regulate the depth and width of plowing at all times and provide for the running of the implement in a position which will prevent the plow from entering the soil, as when transporting the implement from place to place or, as is desirable, in turning when the end of a furrow is reached.

It is also the object of the invention to obtain the above-stated characteristics by a construction that will employ an endless track band for securing the requisite degree of traction with the minimum of weight, so that the bodily tilting of the implement as a whole from side to side or from front to rear, can be readily made by the walking attendant for the effectual control of the plow, and the implement otherwise quickly manipulated.

The invention has also for a further object a provision whereby the propelling endless track band will operate in the furrow cut by the plow and thereby secure a surface for its travel that will produce better traction and a firmer bearing to the operating track band, while at the same time an implement is produced having a narrow width through the use of a single operating track band, so that it can be run between the rows of growing crops for the purposes of cultivation.

The invention consists primarily in combining a plow or other earth working device with a motor-driven tractor comprising an operating endless track band as its traveling and propelling element, and lever handles for the bodily control of the implement as a whole by tilting the same.

The invention further consists in supporting a plow from and immediately in advance of a motor driven traction element having a propelling track band adapted to travel wholly within the furrow made by the plow and arranged in such close relation to the plow as to hold back the over-turned soil from falling into the furrow until the passage of the track band over the smooth bottom of the furrow has been made, and in providing a lever means extending from the traction element whereby the attendant following may control the plow by tilting the device as a whole from side to side or fore and aft, upon its bearing in the furrow.

The invention also consists in certain other novel features in the arrangement and construction of parts, all as hereinafter described, and as specifically pointed out in the appended claims.

In the accompanying drawings,

Figure 1 illustrates a side view of the motor implement constructed in accordance with the invention and shown in position of operation, being controlled by a walking attendant;

Fig. 2 is an enlarged side view of the motor element of the implement including the endless track band, drum and operating gears therefor;

Fig. 3 is a transfer vertical section taken on the line 3—3 of Fig. 2, and

Fig. 4 is a detail showing the front end of the right-hand plow supporting beam.

Referring to the drawings in detail, 10 indicates the side plates of the drum which forms an enclosing supporting structure of the device, and in which are mounted upon the shaft 11 a front pair of idler sprockets 12 which gear with and form the front guide over which the endless track band 13 travels, while at the rear there is mounted within the drum upon the shaft 14 a pair of driven sprocket wheels 15 which engage the links 16 of the track band and impart a traveling movement to the band from the front to the rear, on its under side, as is usual in this type of propulsion for the forward movement of the tractor. The shaft 11 carrying the idler sprockets, in order that it may be adjusted to take up any undue slack in the track band, and also provide for the disengagement of the idler sprocket, therewith, as may be necessary from time to time, as when removal is made of the track band or the said sprockets, is provided with a bearing plate 11ᵃ, on each side, which plate is secured over a shaft slot 11ᵇ, in the side plates 10 of the drum, and is secured to the drum sides by means of the bolts 11ᶜ, the bolt holes for which, in the side plates 10, are horizontally arranged slots to admit of fore and aft adjustment of the shaft bearing plates 11ᵃ. This plate is bent at right angles to form a rear projection 11ᵈ, against which the set screw 11ᵉ bears, for the purposes of the adjustment of the idler sprockets, as indicated. To complete the housing structure of the drum, the sides 10 are connected by a sheet-metal band 10ᵃ, which substantially follows the contour of the sides, but is slightly inset and preferably connected to the sides by means of the angle iron strips 10ᵇ, to which the sides 10 and the band 10ᵃ are riveted. At the points where the idler sprockets 12 and driving sprockets 15 engage the track band link, suitable slots are provided through which the sprockets project into their engagement with the link 16 of the track band.

By reason of the marginal projection of the side plates 10 beyond the connecting band 10ᵃ, there is provided flanges which serve to form a guide to the links of the track band, and also furnish bearings in which are mounted, preferably upon fixed rods 17, the rollers 18, which form the bearings for the track band between the sprockets 12 and 15, and against which rollers the inside surfaces of the links 16, bear, forming the traveling support of the drum and reducing the friction of the travel of the track band thereover.

The disposition of the pair of driving sprockets 15 near the top of the drum, and the formation of the rear portion of the underside of the drum, so that it slants upwardly to the driving sprockets, on an outward curve, which curve the bearing rollers follow, provides a traction portion to the track band that is designed to be brought into action by the bodily tilting up of the tractor by the attendant when it is desired to change the position of the same for the purposes heretofore indicated.

In order that the center of gravity of the device shall be so disposed so as to permit the ready manipulation of the device as a whole by tilting the same, the motor is disposed above the drum and its track band, and substantially central of the normal ground bearing portion of the track band in order that the bodily change of position from side to side and from front to rear, or vice versa, may be accomplished with little effort by the attendant in disturbing the normal balance of the device.

As shown, the motor is preferably of the gasoline type, and is approximately from five to ten horse power, and comprises the cylinder 19, engine base 20, crank shaft 21, starting and balancing wheel 22. The motor is mounted upon a bridge structure formed of sheet metal, with depending sides 22ᵃ, which are firmly secured to the sides 10 of the drum, and permit the track band to travel thereunder.

Upon a shaft 23 at right angles to the crank shaft of the engine, there is mounted at each end a small driving sprocket 24, each being geared by means of a chain belt 25, to a sprocket wheel 26, on the shaft 14, there being provided a sprocket 25 on each projecting end of the shaft 14, for the uniform application of the power to each side. Any suitable mechanism may be employed for throwing the engine into and out of operation with the shaft 23, and such clutch mechanism will be under control of the attendant by means of rods 26 extending to the hand holds of the operating lever handles, after the usual manner of such control means, and in like manner through rod 27, the gasoline feed, (not shown) may be controlled.

The endless track band 13 comprises the metal plates 13ᵃ, formed to overlap the next preceding plate on its under side, and is provided at its overlapping edge, with a V-shaped ridge 13ᵇ, running transverse thereof, to furnish ground-grabbing projections to increase the traction of the track band. These plates are provided adjacent each end thereof with a pair of eye-lugs 13ᶜ, into each pair of which is pivoted a similar pair of lugs 16ᵃ, depending from the links of the track-operating chain, of which there are two, to correspond with the pair of idlers and driving sprockets, and which arrangement of chains and sprockets conduces to uniformity in the application of the power to the track band and provides at each side thereof the requisite support to permit uniformity and operation and support necessary, as when the device is shifted by sidewise tilting from one side to the other.

In the preferred form of the device, the plow 28 is carried in advance of the tractor, and is of a size sufficient to cut a furrow wide enough to receive the entire tractor base and permit its operation on the clean, firm surface cut by the plow, and to this end the connection between the plow and the tractor element is so close as to cause the traction element to hold back the soil which otherwise would fall back into the furrow and partly fill it and cover the furrow floor. In this connection the sides 10 of the traction element resist any tendency of the soil to fall in from either side of the furrow so that the track band is insured operation on the "pan" made by the plow and acts to break up the "pan" by the scoring and penetration thereof by the ground-grabbing projections of the track band plates. The wall retaining function of the sides of the traction element is also efficient in maintaining the implement as a whole in its normal or vertical position against the plow action which tends to tilt the implement to one side, and thus the operation of maintaining the normal position of the implement upon its narrow track band base is made easy for the attendant.

For the purpose of mounting the plow, there is secured to the side plates 10, adjacent their lower edge, metal bars or beams 29, 29', which are horizontally arranged thereon and secured to the side plates by bolts 30, which beams project in advance of the tractor. To the projection of the beam 29, the land side of the plow is attached by means of the bolts 31, and for the purpose of making the attachment strong and rigid, the bar 29 is preferably formed with a depression, corresponding with and designed to receive, the land side, thereby causing it to be substantially flush with the outer side surface of the supporting beam.

The beam 29' on the opposite side of the tractor has its forwardly-projecting end portion bent inward and thence upward to form a support 32 to the mold board 33, to which it is attached by suitable bolts, but these projecting ends of the beam 29, 29', may be varied in their form to adapt them to the various types of plows, or one of special design, to be used with the tractor. Both beams 29 and 29' are formed with upwardly inclined rear extensions, 29ª, to each of which is fastened by means of U-bolts 34 the operating lever handle 35, by which the necessary leverage is acquired and applied by the walking attendant, to give to the implement, as a whole, a change of position for the various manipulations.

In order to further break up the soil, as it is listed to one side by the plow, there is provided one or more harrows 36 and 37, which are arranged to extend from the rear of the tractor and have their support from the beams 29 and 29', and which preferably project slightly to the right of the tractor, in order to be dragged through the upturned soil.

From the foregoing it will be seen that by the employment of a single track band to form the traveling base of the tractor, with the center of gravity substantially central thereof, the tractor as a whole is readily tilted on its traveling base from side to side, imparting the same tilting to the plow, and by reason of the placing of the center of gravity substantially central from front to rear, together with the upward slant of the track base at its rear, the elevation or depression of the plow is easily accomplished, and a tractor plow produced that can be manipulated by the walking attendant in the same manner as though the plow were drawn by horses, and it will also be seen that the narrow track band, in working in the furrow, immediately behind and in close connection with the plow, holds back the soil and enables the tractor band to operate on the clean "pan" made by the plow, and therefore the implement does not pack any loose soil but on the contrary assists in breaking up the "plow pan." Also by reason of the support given the implement upon the comparatively firm bearing surface furnished by the furrow floor the implement is adapted for use in soil too soft upon its surface to permit the working of the same by traction means.

It will also be understood that by reason of the location of the plow in front of the tractor element and in being supported rigidly thereon, together with the lever means extending from the rear of the traction element, the wedging action of the plow assisted by downward pressure on the lever means exerts a strong downward pressure upon the tractor band to give the needed traction without the necessity of securing this traction by increase in the size and weight of the tractor element to a point impracticable for manipulation by the attendant who, when tilting of the implement is required, can release it from this downward pressure and readily accomplish the tilting actions.

What I claim is:—

1. A tillage implement comprising an extended narrow frame, movable supporting means extending substantially throughout the base of the frame, a ground treating element connected to the forward end of said frame for movement therewith in both a longitudinal and transverse direction, and control leverage means extending upwardly from the rear portion of the frame for tilting the frame longitudinally and transversely.

2. A tillage implement comprising an extended narrow frame having a rear, upwardly sloping counter portion, movable supporting means extending substantially throughout the base of the frame and said counter portion, control leverage means extending rearwardly from said frame for tilting the same to shift the support to and from the counter portion, and a soil treating element supported by the frame and controlled by said tilting action.

3. A tillage implement comprising an extended narrow frame having a base adapted to provide a rocking bearing, movable supporting means extending substantially throughout the base of the frame upon which said frame is adapted to have rocking movement, a soil treating element supported in advance of said frame to have control movement therewith, and control leverage means extending rearwardly from said frame for tilting the same during travel.

4. A tillage implement comprising an extended narrow frame, movable supporting means extending substantially throughout the base of the frame, a furrow opener supported on the front of said frame and forming a furrow for the travel of said movable supporting means, a soil working implement carried by said frame and extending to the side thereof to operate upon the soil turned up by the furrow opener, control leverage means extending rearwardly from said frame for tilting the same.

5. A tillage implement comprising a narrow frame having sides adapted to extend within a furrow and maintain it free from loose soil during the passage of the implement, a furrow opener supported on the front of said frame in close relation thereto, a movable supporting means extending substantially throughout the base of the frame and adapted to travel upon the smooth uncovered floor of the furrow, and control leverage means for manipulating the furrow opener.

6. A tillage implement comprising a narrow frame having side supporting walls, a movable supporting means extending substantially throughout the base of said frame between said side walls and adapted to travel with said frame within a furrow, a furrow opener supported on the front of said frame in close relation thereto and adapted to form the furrow in which the frame and its support travels, and leverage means for tilting the implement in both a longitudinal and a transverse direction.

7. A tillage implement comprising a narrow tiltable frame, a movable supporting means extending substantially throughout the base of the frame, a furrow opener supported on the front of said frame and adapted to form a furrow for the travel of said movable support, means for imparting traveling movement to the movable support, and leverage means extending rearwardly from said frame, whereby to increase traction by downward pressure thereon and tilt the implement to control the action of the furrow opener.

8. A tillage implement comprising a narrow frame, an endless supporting track band carried by said frame adapted to operate within a furrow, a furrow opener supported on the front of said frame and adapted to form the furrow for the travel of the track band, and leverage means carried by said frame whereby the implement is tilted as a whole upon the base of the furrow to control the same.

9. A tillage implement comprising a narrow frame, an endless supporting track band carried by said frame having soil penetrating projections, and adapted to operate within a furrow, a furrow opener supported on the front of said frame and adapted to form the furrow for said track band and frame, and leverage means for controlling the implement as a whole.

10. A tillage implement comprising an extended narrow tilting frame, a movable supporting means extending substantially throughout the base of said frame, a soil working element connected to the front of said frame to move with the tilting thereof, a hand lever extending rearwardly from said frame, and a motor mounted upon said frame directly over and actuating said movable supporting means whereby the implement may be tilted both longitudinally and transversely while supported within the furrow.

In testimony whereof I affix my signature in presence of two witnesses.

STEWART V. V. PRINCE.

Witnesses:
  HUGH M. STERLING,
  GEORGE P. MONTAGUE.